United States Patent
Usami (10) Patent No.: US 11,400,771 B2
(45) Date of Patent: Aug. 2, 2022

(54) TIRE PRESSURE DETECTION SYSTEM WITH HIGH POWER SIGNAL TRANSMISSION SYSTEM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Akinori Usami, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 451 days.

(21) Appl. No.: 16/614,022

(22) PCT Filed: May 8, 2018

(86) PCT No.: PCT/JP2018/017820
§ 371 (c)(1),
(2) Date: Nov. 15, 2019

(87) PCT Pub. No.: WO2018/216462
PCT Pub. Date: Nov. 29, 2018

(65) Prior Publication Data
US 2020/0070594 A1    Mar. 5, 2020

(30) Foreign Application Priority Data
May 26, 2017 (JP) .............................. JP2017-104516

(51) Int. Cl.
*B60C 23/04* (2006.01)
*G01L 17/00* (2006.01)

(52) U.S. Cl.
CPC ...... *B60C 23/0416* (2013.01); *B60C 23/0438* (2013.01); *B60C 23/0442* (2013.01); *G01L 17/00* (2013.01)

(58) Field of Classification Search
CPC ............ B60C 23/0408; B60C 23/0496; B60C 23/0494; B60C 23/061; B60C 23/0416;
(Continued)

(56) References Cited

U.S. PATENT DOCUMENTS

2005/0032493 A1* 2/2005 Sugiyama .............. H04B 1/109
455/168.1
2006/0077048 A1* 4/2006 Saitou ................. B60C 23/0408
340/426.33
(Continued)

FOREIGN PATENT DOCUMENTS

JP    2008-112372 A    5/2008
JP    2010-264877 A    11/2010
(Continued)

OTHER PUBLICATIONS

International Search Report, Application No. PCT/JP2018/017820, dated Aug. 14, 2018. ISA/Japan Patent Office.

*Primary Examiner* — Andre J Allen
(74) *Attorney, Agent, or Firm* — Honigman LLP (57) ABSTRACT

A tire pressure detection system that includes a plurality of transmission apparatuses that transmit a request signal for requesting air pressure information of a tire of a vehicle, a detection apparatus that detects air pressure in a tire in accordance with the request signal, and transmits a response signal that includes air pressure information, and an acquisition apparatus that receives the response signal, and acquires the air pressure information, and, in a case of an abnormality where a response signal in response to the request signal of one transmission apparatus is not received by the acquisition apparatus after the one transmission
(Continued)

apparatus has transmitted the request signal to the detection apparatus, another transmission apparatus transmits a high-power request signal of a higher output level than the request signal of the one transmission apparatus.

14 Claims, 7 Drawing Sheets

(58) Field of Classification Search
CPC . B60C 23/0433; B60C 23/0493; B60C 19/00; B60C 23/0479; B60C 23/04; B60C 23/0462; B60C 23/0411; B60C 23/041; B60C 11/24; B60C 23/0444; B60C 23/20; B60C 23/064; B60C 23/0401; B60C 23/0488; B60C 23/062; B60C 23/0413; B60C 23/007; B60C 23/0452; B60C 11/246; B60C 23/06; B60C 23/0442; B60C 23/043; B60C 99/006; B60C 23/0498; B60C 23/00354; B60C 23/02; B60C 23/0467; B60C 2019/004; B60C 23/0428; B60C 23/04985; B60C 23/00372; B60C 23/009; B60C 23/0425; B60C 23/00318; B60C 11/243; B60C 23/004; B60C 23/045; B60C 23/0464; B60C 23/00363; B60C 23/0483; B60C 23/0472; B60C 23/066; B60C 29/02; B60C 11/00; B60C 23/0403; B60C 23/0406; B60C 23/006; B60C 23/008; B60C 23/044; B60C 23/0454; B60C 23/00; B60C 23/0455; B60C 23/0461; B60C 25/002; B60C 23/0415; B60C 23/0474; B60C 23/0489; B60C 29/064; B60C 2200/02; B60C 23/0481; B60C 23/0491; B60C 23/0471; B60C 23/0459; B60C 23/0477; B60C 11/0318; B60C 2019/005; B60C 23/0405; B60C 23/042; B60C 23/002; B60C 23/00336; B60C 23/0422; B60C 25/132; B60C 13/001; B60C 23/0437; B60C 23/0466; B60C 23/0476; B60C 29/06; B60C 9/18; B60C 23/00345; B60C 23/0423; B60C 23/0449; B60C 23/0447; B60C 25/00; B60C 13/00; B60C 17/00; B60C 19/003; B60C 2019/006; B60C 23/0427; B60C 23/0484; B60C 23/0486; B60C 23/065; B60C 17/02; B60C 23/001; B60C 23/0445; B60C 23/08; B60C 5/004; B60C 9/02; B60C 23/0457; B60C 25/142; B60C 25/145; B60C 11/0083; B60C 11/13; B60C 23/0418; B60C 23/0469; B60C 23/127; B60C 25/18; B60C 11/0332; B60C 23/0432; B60C 23/068; B60C 23/126; B60C 25/005; B60C 25/138; B60C 29/00; B60C 5/14; B60C 99/003; B60C 11/03; B60C 11/12; B60C 17/04; B60C 17/06; B60C 23/005; B60C 23/063; B60C 23/135; B60C 23/137; B60C 25/007; B60C 25/0554; B60C 29/062; B60C 29/066; B60C 3/00; B60C 11/0302; B60C 11/032; B60C 11/11; B60C 13/003; B60C 13/02; B60C 19/001; B60C 2011/1213; B60C 2011/1231; B60C 2011/1245; B60C 23/10; B60C 23/131; B60C 23/16; B60C 25/056; B60C 29/005; B60C 29/04; B60C 29/068; B60C 3/04; B60C 5/142; B60C 9/20; B60C 99/00; B60C 11/01; B60C 11/02; B60C 11/0304; B60C 11/0306; B60C 15/06; B60C 17/0009; B60C 19/002; B60C 19/08; B60C 19/12; B60C 2009/2025; B60C 2009/2038; B60C 2011/0374; B60C 2011/0388; B60C 2200/065; B60C 23/00305; B60C 23/00347; B60C 23/0435; B60C 23/067; B60C 23/121; B60C 23/123; B60C 23/133; B60C 23/18; B60C 25/02; B60C 25/05; B60C 5/22; B60C 7/12; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0033; B60C 2011/0358; B60C 2011/1254; B60C 2017/068; B60C 2019/007; B60C 2200/06; B60C 2200/12; B60C 2200/14; B60C 25/0503; B60C 25/0515; B60C 25/0521; B60C 25/0548; B60C 25/0551; B60C 25/15; B60C 25/16; B60C 29/007; B60C 3/06; B60C 5/001; B60C 5/002; B60C 5/02; B60C 5/20; B60C 7/00; B60C 7/105; B60C 7/107; B60C 9/005; B60C 9/1807; B60C 9/28; G01M 17/02; G01M 17/022; G01M 17/027; G01M 17/021; G01M 17/024; G01M 17/025; G01M 17/013; G01M 17/007; G01M 1/045; G01M 1/02; G01M 1/326; G01M 17/06; G01M 1/30; G01M 1/225; G01M 17/0074; G01M 5/0058; G01M 1/26; G01M 17/04; G01M 17/0072; G01M 17/065; G01M 17/10; G01M 1/16; G01M 7/00; G01M 99/00; G01M 3/40; G01M 7/08; G01M 1/34; G01M 1/04; G01M 17/028; G01M 17/045; G01M 17/08; G01M 3/3218; G01M 1/365; G01M 13/04; G01M 17/03; G01M 5/0066; G01M 5/0091; G01M 1/00; G01M 1/08; G01M 1/22; G01M 13/027; G01M 15/044; G01M 5/0033; G01M 5/0075; G01M 1/06; G01M 1/12; G01M 1/122; G01M 1/24; G01M 1/32; G01M 1/36; G01M 11/081; G01M 13/023; G01M 13/025; G01M 17/00; G01M 17/0076; G01M 3/022; G01M 3/04; G01M 3/042; G01M 3/045; G01M 3/147; G01M 3/227; G01M 3/24; G01M 3/2876; G01M 3/3236; G01M 5/0016; G01M 5/0025; G01M 5/0083; G01M 7/02; G01M 7/022; G01M 7/025; G01M 7/04; G01M 7/06; G01M 9/02; G01M 9/04; G01M 99/002; G01M 99/004
USPC .................................................. 73/146–146.8
See application file for complete search history.

(56) References Cited

U.S. PATENT DOCUMENTS

2009/0237228 A1   9/2009  Watabe
2014/0088816 A1   3/2014  Shima et al.

(56) References Cited

U.S. PATENT DOCUMENTS

2018/0312020 A1* 11/2018 Saburi ................. B60C 23/0464
2018/0361803 A1* 12/2018 Saburi ................. B60C 23/0442

FOREIGN PATENT DOCUMENTS

| JP | 2018047850 A | * | 3/2018 |
| JP | 2018047851 A | * | 3/2018 |
| JP | 2018-079792 A | | 5/2018 |
| JP | 2019156280 A | * | 9/2019 |

* cited by examiner

| Tire position | Sensor identification information |
|---|---|
| Front right | A |
| Rear right | B |
| Rear left | C |
| Front left | D |

TIRE PRESSURE DETECTION SYSTEM WITH HIGH POWER SIGNAL TRANSMISSION SYSTEM

CROSS-REFERENCE TO RELATED APPLICATIONS

This application is the U.S. national stage of PCT/JP2018/017820 filed on May 8, 2018, which claims priority of Japanese Patent Application No. JP 2017-104516 filed on May 26, 2017, the contents of which are incorporated herein.

TECHNICAL FIELD

The present disclosure relates to a tire pressure detection system for detecting air pressure in a tire of a vehicle.

BACKGROUND

JP 2012-240615A discloses a tire pressure monitor apparatus that can more accurately determine wheel positions of detection apparatuses provided on respective tires (positions at which the tires are attached to the vehicle), by the detection apparatuses transmitting, at certain intervals, a plurality of frames formed by duplicating signals to be transmitted, the frames including information regarding rotation positions (rotation angles) of the detection apparatuses when the frames are transmitted, and a monitoring apparatus disposed in the vehicle that estimates the rotation positions when the frames are being transmitted by the detection apparatuses, based on the information regarding received frames from among the plurality of frames.

The tire pressure monitor apparatus of JP 2012-240615A described above can only solve the problem of the monitoring apparatus being unable to receive a signal transmitted by a detection apparatus due to the detection apparatus being positioned at a Null point.

Accordingly, it is not possible to solve the problem of a detection apparatus being unable to receive the request signal transmitted from an LF transmission antenna to the detection apparatus, due to the detection apparatus being positioned at a Null point, and the detection apparatus therefor not transmitting a signal that includes air pressure information.

In view of this, the present disclosure aims to provide a tire pressure detection system that can cause a detection apparatus to transmit a signal that includes air pressure information, and acquire the air pressure information from the detection apparatus, even if the detection apparatus cannot receive the request signal transmitted from the LF transmission antenna to the detection apparatus due to the detection apparatus being positioned at a Null point.

SUMMARY

A tire pressure detection system according to a mode of the present disclosure includes a plurality of transmission apparatuses that transmit a request signal for requesting air pressure information of a tire of a vehicle, a detection apparatus that detects air pressure in a tire in accordance with the request signal, and transmits a response signal that includes air pressure information, and an acquisition apparatus that receives the response signal, and acquires the air pressure information, and the plurality of transmission apparatuses include one transmission apparatus that transmits the request signal to the detection apparatus and another transmission apparatus that transmits a high-power request signal of a higher output level than the request signal of the one transmission apparatus in a case of an abnormality where a response signal in response to the request signal of the one transmission apparatus is not received by the acquisition apparatus.

Note that the present application can be realized not only as such a characteristic tire pressure detection system provided with processing units, but also as a tire pressure detection method or transmission method in which such characteristic processes are regarded as steps, and a computer program for causing a computer to execute such steps. In addition, the present application can be realized as a semiconductor integrated circuit that realizes a portion or the entity of a tire pressure detection system, or can be realized as another system that includes a tire pressure detection system.

Advantageous Effects of Disclosure

According to this disclosure, even if a detection apparatus cannot receive the request signal due to the detection apparatus being positioned at a Null point, it is possible to cause the detection apparatus to transmit a signal that includes air pressure information, and acquire the air pressure information from the detection apparatus.

DETAILED DESCRIPTION OF PREFERRED EMBODIMENTS

First, embodiments of the present disclosure will be enumerated and described. At least portions of the embodiments to be described below may be combined suitably.

A tire pressure detection system according to one aspect of the present disclosure includes a plurality of transmission apparatuses that transmit a request signal for requesting air pressure information of a tire of a vehicle, a detection apparatus that detects air pressure in a tire in accordance with the request signal, and transmits a response signal that includes air pressure information, and an acquisition apparatus that receives the response signal, and acquires the air pressure information, and the plurality of transmission apparatuses include one transmission apparatus that transmits the request signal to the detection apparatus and another transmission apparatus that transmits a high-power request signal of a higher output level than the request signal of the one transmission apparatus in a case of an abnormality where a response signal in response to the request signal of the one transmission apparatus is not received by the acquisition apparatus.

In the tire pressure detection system according to the above one aspect, the one transmission apparatus transmits the request signal to the detection apparatus, and the other transmission apparatus transmits a high-power request signal of a higher output level than the request signal of the one transmission apparatus in the case of an abnormality where a response signal in response to the request signal of the one transmission apparatus is not received by the acquisition apparatus.

Accordingly, so-called crosstalk occurs between the other transmission apparatus and the detection apparatus, and the detection apparatus transmits a response signal in response to the high-power request signal from the other transmission apparatus, and thus the acquisition apparatus can receive the response signal, and acquire air pressure information.

In the tire pressure detection system according to one aspect of the present disclosure, a plurality of tires are included, the detection apparatus is provided on each of the tires, and, in a normal case different from the abnormality, the one transmission apparatus transmits the request signal to one detection apparatus, and causes the one detection apparatus to return the response signal, and the other transmission apparatus transmits the request signal to detection apparatuses excluding the one detection apparatus, and causes the detection apparatuses to return the response signal.

In the tire pressure detection system according to the above one aspect, in a normal case, the one transmission apparatus transmits the request signal to one detection apparatus, and the other transmission apparatuses transmit the request signal to the detection apparatuses excluding the one detection apparatus. However, in the case of an abnormality where the acquisition apparatus is unable to receive a response signal from the one detection apparatus after the one transmission apparatus transmits the request signal to the one detection apparatus, one of the other transmission apparatuses transmits the high-power request signal, so as to cause crosstalk with the one detection apparatus.

Accordingly, the one detection apparatus can transmit a response signal, and the acquisition apparatus can acquire air pressure information included in the response signal.

In the tire pressure detection system according to one aspect of the present disclosure, a plurality of tires are included, the detection apparatus is provided on each of the tires, and, in a normal case different from the abnormality, the one transmission apparatus transmits the request signal to one detection apparatus, and causes the one detection apparatus to return the response signal, and the other transmission apparatus is disposed in a cabin of the vehicle.

In the tire pressure detection system according to one aspect of the present disclosure, in a normal case, the one transmission apparatus transmits the request signal to one detection apparatus. However, in the case of an abnormality where the acquisition apparatus is unable to receive a response signal from the one detection apparatus after the one transmission apparatus has transmitted the request signal to the one detection apparatus, the other transmission apparatus disposed in the cabin of the vehicle transmits the high-power request signal, so as to cause crosstalk with the one detection apparatus.

Accordingly, the one detection apparatus can transmit a response signal, and the acquisition apparatus can acquire air pressure information included in the response signal.

In the tire pressure detection system according to one aspect of the present disclosure, a plurality of tires are included, the detection apparatus is provided on each of the tires, and, in a normal case different from the abnormality, the one transmission apparatus transmits the request signal to one detection apparatus, and causes the one detection apparatus to return the response signal, and the other transmission apparatus is disposed in a storage portion of the vehicle.

In the tire pressure detection system according to the above one aspect, in a normal case, the one transmission apparatus transmits the request signal to one detection apparatus. However, in the case of an abnormality where the acquisition apparatus is unable to receive a response signal from the one detection apparatus after the one transmission apparatus transmits the request signal to the one detection apparatus, the other transmission apparatus disposed in the storage portion of the vehicle transmits the high-power request signal, so as to cause crosstalk with the one detection apparatus.

Accordingly, the one detection apparatus can transmit a response signal, and the acquisition apparatus can acquire air pressure information included in the response signal.

In the tire pressure detection system according to one aspect of the present disclosure, the response signal includes identification information of a detection apparatus that transmitted the response signal, and the tire pressure detection system includes a storage unit that stores identification information of a plurality of detection apparatuses provided on the respective tires, and an identifying unit that identifies a response signal from the one detection apparatus, based on the identification information in the storage unit, if a plurality of response signals were received in response to the high-power request signal.

In the tire pressure detection system according to the above one aspect, crosstalk with a plurality of detection apparatuses occurs due to the high-power request signal, and if a plurality of response signals are received, the identifying unit identifies a response signal from the one detection apparatus, from among the plurality of response signals based on the identification information in the storage unit. Accordingly, the acquisition apparatus can acquire air pressure information included in the response signal.

In the tire pressure detection system according to one aspect of the present disclosure, the response signal includes identification information of a detection apparatus that transmitted the response signal, the plurality of transmission apparatuses are arranged respectively in correspondence with detection apparatuses to which the request signal is transmitted in the normal case, and the tire pressure detection system includes a transmission instruction unit that gives a transmission instruction for instructing the other transmission apparatuses to transmit the request signal to the respective detection apparatuses to which the request signal is transmitted, if no response signal is received in response to the request signal of the one transmission apparatus, an identification information acquisition unit that acquires the identification information from the response signal in response to the request signal transmitted in accordance with the transmission instruction, and an identifying unit that identifies a response signal from the one detection apparatus based on the acquired identification information, if a plurality of response signals are received in response to the high-power request signal.

In the tire pressure detection system according to the above one aspect, in the case of an abnormality where no response signal is received in response to the request signal of the one transmission apparatus, the transmission instruction unit gives a transmission instruction to the other transmission apparatuses, and the identification information acquisition unit acquires the identification information from the response signal in response to the request signal transmitted in accordance with the transmission instruction. After that, crosstalk with a plurality of detection apparatus occurs due to the high-power request signal, and, if a plurality of response signals are received, the identifying unit identifies a response signal from the one detection apparatus, from among the plurality of response signals based on the identification information acquired by the identification information acquisition unit. Accordingly, the acquisition apparatus can acquire air pressure information included in the response signal.

In the tire pressure detection system according to one aspect of the present disclosure, the number of other transmission apparatuses is two or more, and the plurality of other transmission apparatuses sequentially transmit the high-power request signal.

In the tire pressure detection system according to the above one aspect, there may be a case where a response signal cannot be received in response to a high-power request signal for some reason, and thus a plurality of other transmission apparatuses sequentially transmit the high-power request signal.

Detailed Embodiments of Present Disclosure

Specific examples of a tire pressure detection system according to embodiments of the present disclosure will be described below with reference to the drawings. Note that the present disclosure is not limited to these illustrative examples, and is indicated by the scope of claims, and is intended to include all modifications that are within the meanings and the scope that are equivalent to those of the scope of claims.

First Embodiment

Figure 1:
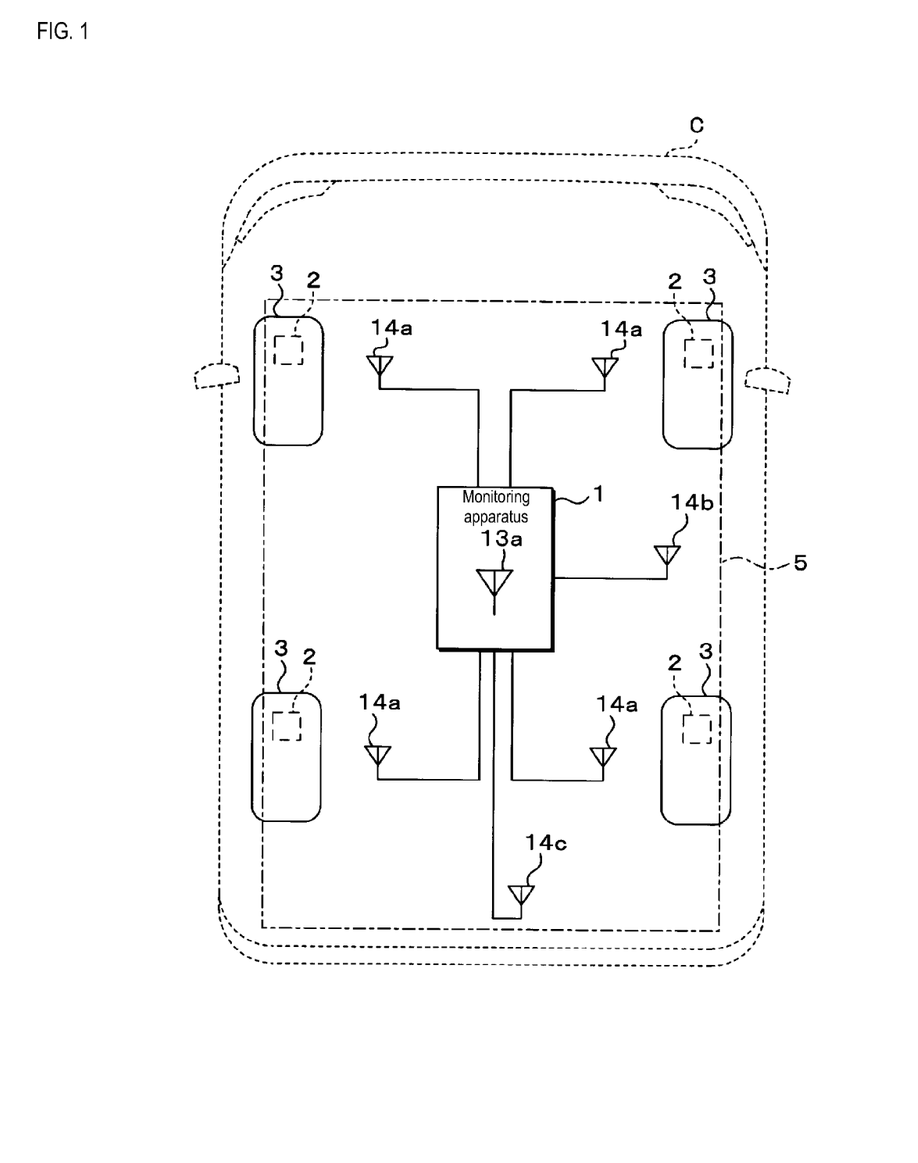
FIG. 1 is a conceptual diagram illustrating an example of a main configuration of a tire pressure detection system according to a first embodiment.

FIG. 1 is a conceptual diagram illustrating an example of a main configuration of a tire pressure detection system according to a first embodiment. A tire pressure detection system 5 according to the first embodiment is provided with a monitoring apparatus 1 (acquisition apparatus) provided as appropriate in the body of a vehicle C, and detection apparatuses 2 provided respectively on wheels of a plurality of tires 3 provided on the vehicle C. In the tire pressure detection system 5 of the first embodiment, the monitoring apparatus 1 performs unilateral or bilateral wireless communication with the detection apparatuses 2 to acquire air pressure of the tires 3, and a notification apparatus 4, which will be described later, makes a notification according to the acquired air pressure. A plurality of LF transmission antennas 14a that perform wireless communication with the plurality of detection apparatuses 2 provided on the respective tires 3 are connected to the monitoring apparatus 1. For example, the LF transmission antennas 14a are arranged in the vicinity of the respective detection apparatuses 2. The detection apparatuses 2 are arranged in a range in which the detection apparatuses 2 can receive a signal transmitted from the corresponding LF transmission antennas 14a. The signal output level of each of the LF transmission antennas 14a is set to enable wireless communication only with the corresponding detection apparatus 2, within a range in which so-called crosstalk does not occur.

The tire pressure detection system 5 according to the first embodiment can detect air pressure in a tire in two communication modes. One of the two modes is an autonomous transmission mode in which a detection apparatus 2 autonomously transmits a detection result of air pressure (hereinafter, referred to as "air pressure information") to the monitoring apparatus 1, and the other is a non-autonomous transmission mode in which a detection apparatus 2 transmits air pressure information to the monitoring apparatus 1 in response to a request from the monitoring apparatus 1. A description will be given below under the assumption that the tire pressure detection system 5 detects air pressure information using the non-autonomous communication mode.

In the non-autonomous communication mode, the monitoring apparatus 1 transmits a request signal for requesting air pressure information of the tires 3, from the LF transmission antennas 14a (transmission apparatuses) to the corresponding detection apparatuses 2, using radio waves in the LF band. Each of the detection apparatuses 2 detects air pressure in the tire 3 in response to the request signal from the corresponding LF transmission antenna 14a, and transmits a response signal that includes detected and acquired air pressure information and identification information of the detection apparatus 2 itself, to the monitoring apparatus 1 using the radio wave of a UHF (Ultra High Frequency) band.

On the other hand, the monitoring apparatus 1 is provided with an RF receiving antenna 13a, and receives response signals transmitted from the detection apparatuses 2 via the RF receiving antenna 13a. As will be described later, the monitoring apparatus 1 stores the relationship between positions in the vehicle C at which the tires 3 are provided (hereinafter, referred to as "tire positions") and identification information of the detection apparatuses 2 provided on the tires 3 at the tire positions, and thus can identify air pressure information of the tires 3 using identification information included in response signals. Note that the LF band and the UHF band are examples of a radio wave band used when performing wireless communication, and the present disclosure is not necessarily limited thereto.

The notification apparatus 4 is connected to the monitoring apparatus 1 via a communication line, and the monitoring apparatus 1 transmits acquired air pressure information to the notification apparatus 4. The notification apparatus 4 receives the air pressure information transmitted from the monitoring apparatus 1, and notifies the driver of the air pressure in the tires 3. For example, if air pressure in a tire 3 is lower than a predetermined threshold, the notification apparatus 4 gives an alert to the driver.

Figure 2:
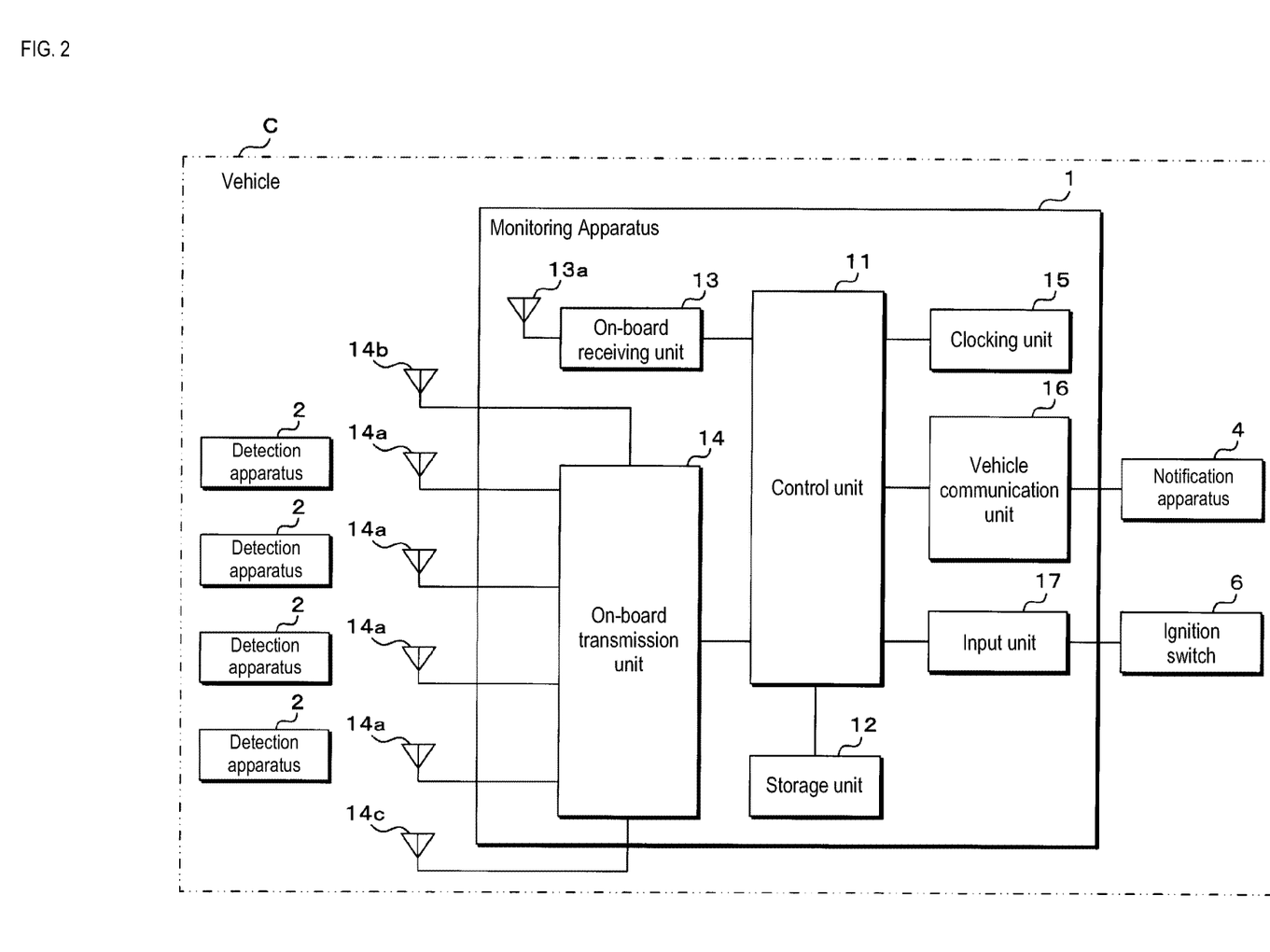
FIG. 2 is a block diagram illustrating an example of a main configuration of a monitoring apparatus according to the first embodiment.

FIG. 2 is a block diagram illustrating an example of a main configuration of the monitoring apparatus 1 according to the first embodiment. The monitoring apparatus 1 is provided with a control unit 11 that controls operations of constituent elements of the monitoring apparatus 1. A storage unit 12, an on-board receiving unit 13, an on-board transmission unit 14, a clocking unit 15, an in-vehicle communication unit 16, and an input unit 17 are connected to the control unit 11.

The control unit 11 is a microcomputer that includes at least one CPU (Central Processing Unit), a multicore CPU, a ROM (Read Only Memory), a RAM (Random Access Memory), an input/output interface, and the like.

Figure 3:
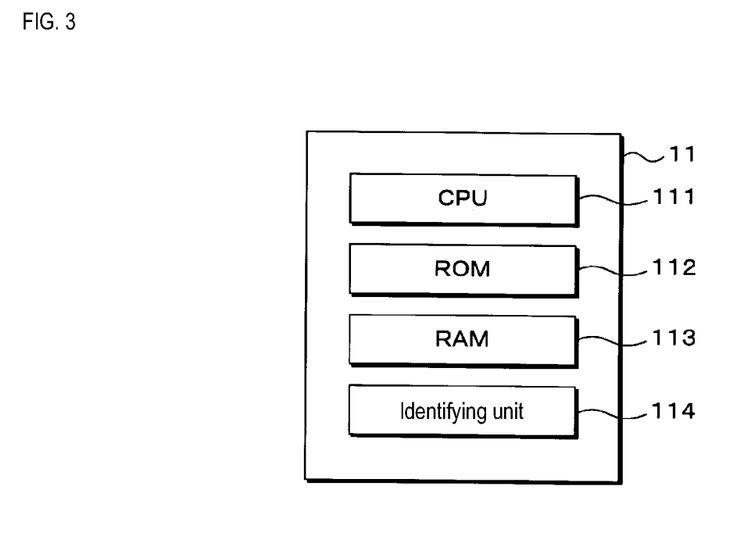
FIG. 3 is a functional block diagram illustrating an example of a main configuration of a control unit according to the first embodiment.

FIG. 3 is a functional block diagram illustrating an example of a main configuration of the control unit 11 of the first embodiment. The control unit 11 has a CPU 111, a ROM 112, a RAM 113, and also an identifying unit 114.

The CPU 111 of the control unit 11 is connected to the storage unit 12, the on-board receiving unit 13, the on-board transmission unit 14, the clocking unit 15, the in-vehicle communication unit 16, and the input unit 17 via the input/output interface. By loading a control program stored in the ROM 112 in advance, to the RAM 113, and executing the program, the CPU 111 controls the above-described constituent elements, and executes tire pressure detection processing according to the first embodiment and the like.

If a response signal is received in response to transmission of a request signal, the identifying unit 114 identifies which tire position of a tire 3 the air pressure information included in the response signal corresponds to, in other words a detection apparatus 2 from which the response signal was transmitted. For example, by matching the identification information included in the response signal with an identification information table in the storage unit 12, which will be described later, the identifying unit 114 identifies which tire position of a tire 3 the air pressure information included in the response signal corresponds to. Also, if a plurality of response signals are received in response to transmission of a high-power request signal to be described later, the identifying unit 114 identifies which tire position of a tire 3 the air pressure information included in each of the response signals corresponds to, by matching the identification information included in each of the response signals with the identification information table in the storage unit 12.

The storage unit 12 is a nonvolatile memory such as an EEPROM (Electrically Erasable Programmable ROM, registered trademark) or a flash memory. In addition, the storage unit 12 stores the identification information table.

Figure 4:
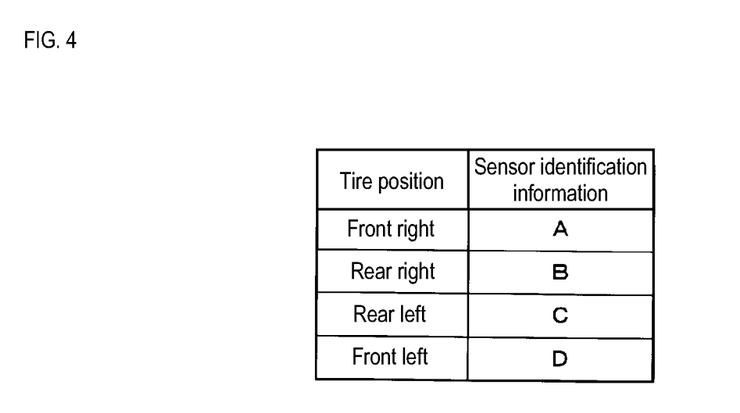
FIG. 4 is a conceptual diagram illustrating an example of an identification information table stored in a storage unit according to the first embodiment.

FIG. 4 is a conceptual diagram illustrating an example of the identification information table stored in the storage unit 12 according to the first embodiment. In the identification information table, a plurality of tire positions (positional information) and identification information of the detection apparatuses 2 provided on the tires 3 at the tire positions are associated with each other. In the example shown in FIG. 4, corresponding identification information pieces A to D of the detection apparatuses 2 are respectively associated with front right, rear right, rear left, and front left tire positions in the vehicle C. Furthermore, the storage unit 12 may also store the LF transmission antennas 14a associated respectively with the detection apparatuses 2.

On the other hand, in order to make the wear states of the four tires uniform, tire rotation in which front and rear tires are exchanged with each other is commonly performed. When the positions of tires are changed in this manner, the monitoring apparatus 1 is required to update the identification information table. This can be handled by acquiring phase angle information of each of the tires 3 via the corresponding detection apparatus 2, and matching the phase angle information with a measurement result of the wheel speed of the tire 3. This will be described in detail below.

By providing tire phase angle sensors in the respective detection apparatuses 2, the phase angles of the tires 3 can be detected. The tire phase angle sensors are provided on the wheels of the tires 3, and detect phase angles of rotation of the tires 3. Each of the tire phase angle sensors has an acceleration sensor, for example. When a tire 3 rotates, the position of the tire phase angle sensor changes, and the direction of gravity received by the acceleration sensor changes. The tire phase angle sensor detects the phase angle of the tire 3 by detecting the direction of gravity. The detection apparatus 2 adds the detected phase angle as phase angle information to a response signal, and transmits the response signal.

On the other hand, wheel speed sensors are provided in the vehicle C, and the wheel speeds of the tires 3 are detected. The wheel speeds of the tires 3 can be acquired based on wheel speed information detected by the wheel speed sensors.

For example, the control unit 11 calculates the wheel speed of a tire 3 corresponding to a detection apparatus 2 that has transmitted phase angle information, based on phase angle information included in a received response signal. By acquiring the phase angles of a tire 3 detected at predetermined time intervals, namely a plurality of different time points, the wheel speed of the tire 3 can be obtained based on information regarding phase angles at predetermined time intervals and at different time points.

The control unit 11 then matches the wheel speeds of the tires 3 acquired via the wheel speed sensors with the calculated wheel speeds of the tires 3, and obtains a combination of wheel speeds approximated to each other, and can thereby recognize a tire position (tire) corresponding to the detection apparatus 2 that has transmitted the phase angle information. In this manner, the control unit 11 identifies the correspondence relation between identification information included in each response signal and a tire position, and updates the identification information table.

The RF receiving antenna 13a is connected to the on-board receiving unit 13. The on-board receiving unit 13 receives, via the RF receiving antenna 13a, a signal (e.g., response signal) transmitted from a detection apparatus 2 using a radio wave in an RF band. The on-board receiving unit 13 demodulates a received signal, and outputs the demodulated signal to the control unit 11. The UHF band of 300 MHz to 3 GHz is used by the carrier wave, but there is no limitation to this frequency band.

The LF transmission antennas 14a (transmission apparatuses) that transmit a request signal to the detection apparatuses 2, an in-cabin LF transmission antenna 14b (transmission apparatus) provided in the cabin of the vehicle C and used for signal transmission to a mobile device held by a passenger in the cabin, and a storage portion LF transmission antenna 14c (transmission apparatus) provided in a storage portion in the vehicle and used for transmitting a signal to a mobile device outside of the cabin are connected to the on-board transmission unit 14. The storage portion LF transmission antenna 14c is provided inside or outside of the trunk of the vehicle C, for example. The on-board transmission unit 14 modulates a signal that has been output from the control unit 11, to a signal in the LF band, and causes the modulated signal to be transmitted from the plurality of LF transmission antennas 14a, the in-cabin LF transmission antenna 14b, or the storage portion LF transmission antenna 14c. The LF band of 30 kHz to 300 kHz is used by the carrier wave, but there is no limitation to this frequency band.

Each of the LF transmission antennas 14a is associated with a nearby detection apparatus 2, and, in normal cases different from the case of an abnormality to be described later, transmits the request signal to the detection apparatus 2, and causes a response signal to be returned. As described above, the signal output level of the LF transmission antennas 14a is limited, and the LF transmission antennas 14a are arranged such that a request signal from each of the LF transmission antennas 14a reaches only a nearby detection apparatus 2. In other words, each of the LF transmission antennas 14a is arranged in correspondence with the detection apparatus 2 to which the LF transmission antenna 14a transmits a request signal.

The clocking unit 15 is constituted by a timer, a real-time clock, and the like, and starts clocking in accordance with an instruction of the control unit 11, and sends a clocking result to the control unit 11.

The in-vehicle communication unit 16 is a communication circuit that performs communication in compliance with a communication protocol of CAN (Controller Area Network), LIN (Local Interconnect Network), or the like, and is connected to the notification apparatus 4. The in-vehicle communication unit 16 transmits information regarding air pressure of the tires 3 to the notification apparatus 4 in accordance with an instruction from the control unit 11.

For example, the notification apparatus 4 is an audio device provided with a display unit or a speaker that makes a notification, using an image or sound, of information regarding air pressure of the tires 3 transmitted from the in-vehicle communication unit 16, a display unit provided on a meter of an instrument panel, or the like. The display unit is a liquid crystal display, an organic EL display, a head-up display, or the like. For example, the notification apparatus 4 displays air pressure information of the tires 3 provided in the vehicle C. In addition, when an abnormality where the air pressure of a tire 3 is below a predetermined threshold, or the like, occurs, such content of the abnormality is displayed.

An ignition switch signal (hereinafter, referred to as "IG switch signal") that is based on the operation state of an ignition switch 6 is input to the input unit 17, and the control unit 11 can recognize the operation state of the ignition switch 6 based on the IG switch signal that has been input to the input unit 17.

On the other hand, there are cases where, although an LF transmission antenna 14a has transmitted a request signal to the corresponding detection apparatus 2, the detection apparatus 2 cannot receive the request signal. Such a problem arises when the detection apparatus 2 is positioned at a so-called Null point. However, the tire pressure detection system 5 according to the first embodiment is configured to solve such a problem.

Figure 5:
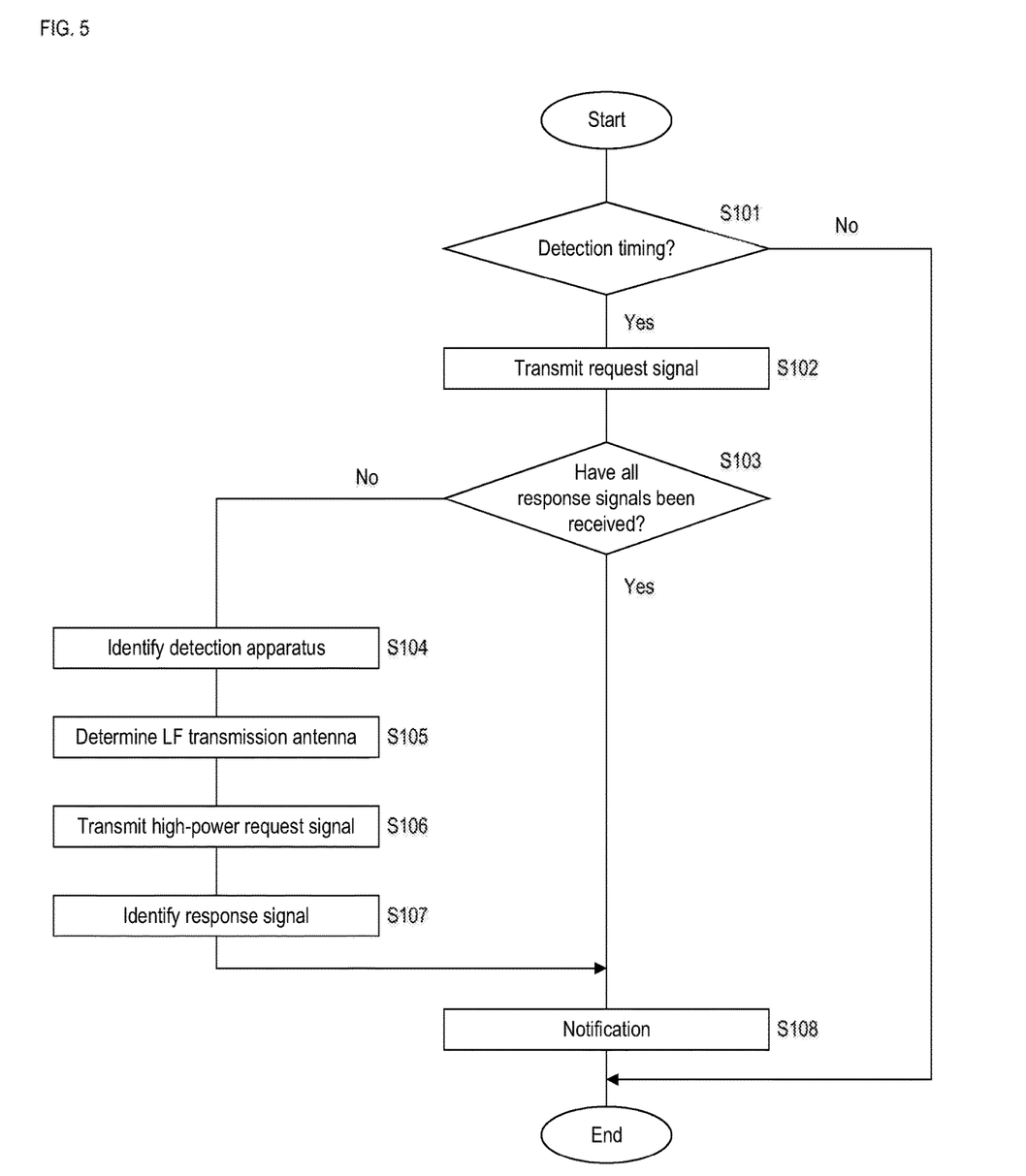
FIG. 5 is a flowchart illustrating a procedure of tire pressure detection processing in the tire pressure detection system according to the first embodiment.

FIG. 5 is a flowchart illustrating a procedure of tire pressure detection processing in the tire pressure detection system 5 according to the first embodiment. For convenience of description, a description is given below assuming that the control unit 11 of the monitoring apparatus 1 executes the following processing when the ignition switch 6 changes from an off state to an on state.

The CPU 111 determines whether or not the timing is a required detection timing (step S101). For example, the detection timing is a time point that arises at predetermined time intervals, and the CPU 111 can recognize the detection timing by referencing the clocking unit 15. In addition, the detection timing may also be one predetermined timing after tire pressure detection processing has started, or a plurality of timings. If it is determined that the timing is not the detection timing (step S101: NO), the CPU 111 ends the tire pressure detection processing.

On the other hand, if it is determined that the timing is the detection timing (step S101: YES), the CPU 111 instructs the LF transmission antennas 14a to transmit a request signal. The LF transmission antennas 14a transmit a request signal to the corresponding detection apparatuses 2 in accordance with the instruction made by the CPU 111 (step S102). The request signal may be transmitted by the LF transmission antennas 14a substantially at the same time, or may be transmitted in a predetermined order.

If a detection apparatus 2 transmits a response signal in response to the request signal, the RF receiving antenna 13a receives the response signal.

Next, the CPU 111 determines whether or not response signals have been respectively received from all of the detection apparatuses 2 (step S103). For example, such determination is performed by the CPU 111 monitoring the RF receiving antenna 13a, and determining whether or not four response signals that include different pieces of identification information have been received.

If the CPU 111 determines that response signals have been received from all of the detection apparatuses 2 (step S103: YES), the identifying unit 114 matches identification information included in the received response signals with identification information registered in the identification information table. Accordingly, the identifying unit 114 determines which tire position (a tire 3) the air pressure information included in each of the response signals corresponds to.

The CPU 111 then outputs the air pressure information of the determined tire positions, to the notification apparatus 4. The notification apparatus 4 notifies the driver of the air pressure information (step S108).

On the other hand, if it is determined that a response signal has not been received from all of the detection apparatuses 2 (step S103: NO), the CPU 111 identifies a detection apparatus 2 from which no response signal has been received (step S104). Specifically, the CPU 111 matches identification information included in received response signals with identification information registered in the identification information table, and can thereby identify identification information of a detection apparatus 2 (hereinafter, referred to as "non-received detection apparatus 2") from which no response signal has been received. In this case, it can be presumed that the non-received detection apparatus 2 is positioned at a Null point. If a non-received detection apparatus 2 is positioned at a Null point, a request signal from a corresponding LF transmission antenna 14a cannot be received, and thus the non-received detection apparatus 2 does not transmit a response signal. Therefore, an abnormality where the on-board receiving unit 13 (the RF receiving antenna 13a) cannot receive a response signal from the non-received detection apparatus 2 occurs.

At this time, the CPU 111 determines one LF transmission antenna 14a (another transmission apparatus) that is to transmit a high-power request signal (step S105). As described above, the non-received detection apparatus 2 can be identified, and thus the CPU 111 determines one LF transmission antenna 14a from among the LF transmission antennas 14a excluding the LF transmission antenna 14a corresponding to the non-received detection apparatus 2 (one transmission apparatus). To be specific, the CPU 111 determines one LF transmission antenna 14a, out of the LF transmission antennas 14a corresponding to the detection apparatuses 2 excluding the non-received detection apparatus 2, from among the detection apparatuses 2 corresponding to the four tires 3. The present disclosure is not limited thereto, and the CPU 111 may also determine an LF transmission antenna 14a that is closest to the non-received detection apparatus 2.

In addition, the CPU 111 instructs the determined LF transmission antenna 14a determined in step S105 to transmit a high-power request signal. The high-power request signal has a higher output level than an output level used for transmission of a request signal only between an LF transmission antenna 14a and a detection apparatus 2 that have a correspondence relation, and has a communication range that covers the other detection apparatuses 2 that have no correspondence relation (with the LF transmission antenna 14a that has transmitted the high-power request signal). In other words, the high-power request signal has an output level at which crosstalk occurs with the other detection apparatuses 2 that have no correspondence relation (with the LF transmission antenna 14a that has transmitted the high-power request signal).

The determined LF transmission antenna 14a transmits a high-power request signal in accordance with an instruction from the CPU 111 (step S106). The high-power request signal transmitted by the determined LF transmission antenna 14a is received by a plurality of detection apparatuses 2 including the non-received detection apparatus 2, and thus crosstalk with the plurality of detection apparatuses 2 including the non-received detection apparatus 2 occurs. Therefore, the plurality of detection apparatuses 2 transmit a response signal in response to the high-power request signal. Thus, the RF receiving antenna 13a receives a plurality of response signals from the plurality of detection apparatuses 2.

The identifying unit 114 matches identification information included in the response signals received from the plurality of detection apparatuses 2 via the RF receiving antenna 13a with the identification information registered in the identification information table. Accordingly, the identifying unit 114 identifies a response signal from the non-received detection apparatus 2 (step S107). Therefore, air pressure information included in the response signal from the non-received detection apparatus 2 can be acquired.

By performing the above-described processing, response signals from all of the detection apparatuses 2 are received, and the identifying unit 114 matches the identification information included in the received response signals with the identification information registered in the identification information table. Accordingly, the identifying unit 114 determines which tire position (a tire 3) the air pressure information included in each of the response signals corresponds to. After that, the CPU 111 advances the procedure to step S108.

As described above, in the tire pressure detection system 5 according to the first embodiment, even when a predetermined detection apparatus 2 is positioned at a Null point, it is possible to receive a response signal from the detection apparatus 2 positioned at the Null point, and acquire air pressure information.

Second Embodiment

A tire pressure detection system 5 according to a second embodiment has a configuration similar to that of the tire pressure detection system 5 according to the first embodiment. However, processing for determining an LF transmission antenna 14a that is to transmit a high-power request signal is different.

In the tire pressure detection system 5 according to the first embodiment, one LF transmission antenna 14a that is to transmit a high-power request signal is determined from among the LF transmission antennas 14a corresponding to the detection apparatuses 2 excluding a non-received detection apparatus 2, in step S105 in FIG. 5.

In contrast, in the tire pressure detection system 5 according to the second embodiment, an in-cabin LF transmission antenna 14b provided in the cabin of the vehicle C and used for transmitting signals to a mobile device held by a passenger in the cabin is determined as an LF transmission antenna 14a that is to transmit a high-power request signal.

Specifically, in the tire pressure detection system 5 according to the second embodiment, when a predetermined detection apparatus 2 is positioned at a Null point, the in-cabin LF transmission antenna 14b provided in the cabin of the vehicle C transmits a high-power request signal, so as to cause crosstalk with a plurality of detection apparatuses 2 including the non-received detection apparatus 2. The plurality of detection apparatuses 2 transmit a response signal in response to the high-power request signal, and thus a plurality of response signals are received from the plurality of detection apparatuses 2 by the RF receiving antenna 13a.

At this time, the identifying unit 114 matches identification information included in the response signals received from the plurality of detection apparatuses 2 via the RF receiving antenna 13a, with identification information registered in the identification information table, and identifies a response signal from the non-received detection apparatus 2. Accordingly, air pressure information from the detection apparatus 2 positioned at the Null point can be acquired.

Third Embodiment

A tire pressure detection system 5 according to a third embodiment has a configuration similar to those of the tire pressure detection systems 5 according to the first and second embodiments. However, processing for determining an LF transmission antenna 14a that is to transmit a high-power request signal is different.

In the tire pressure detection system 5 according to the first embodiment, one LF transmission antenna 14a that is to transmit a high-power request signal is determined from among the LF transmission antennas 14a corresponding to the detection apparatuses 2 excluding a non-received detection apparatus 2, in step S105 in FIG. 5.

In addition, in the tire pressure detection system 5 according to the second embodiment, the in-cabin LF transmission antenna 14b is determined as an LF transmission antenna 14a that is to transmit a high-power request signal.

In contrast, in the tire pressure detection system 5 according to the third embodiment, a storage portion LF transmission antenna 14c provided in a storage portion in the vehicle and used for signal transmission to a mobile device outside of the cabin is determined as an LF transmission antenna that is to transmit a high-power request signal. The storage portion LF transmission antenna 14c is provided on the rear bumper of the vehicle C, for example.

Specifically, in the tire pressure detection system 5 according to the third embodiment, when a predetermined detection apparatus 2 is positioned at a Null point, the storage portion LF transmission antenna 14c provided on the rear bumper of the vehicle C transmits a high-power request signal, so as to cause crosstalk with a plurality of detection apparatuses 2 including the non-received detection apparatus 2. The plurality of detection apparatuses 2 transmit a response signal in response to the high-power request signal, and thus a plurality of response signals are received from the plurality of detection apparatuses 2 by the RF receiving antenna 13a.

At this time, the identifying unit 114 matches identification information included in the response signals from the plurality of detection apparatuses 2 received via the RF receiving antenna 13a, with identification information registered in the identification information table, and identifies a response signal from the non-received detection apparatus 2. Accordingly, air pressure information from the detection apparatus 2 positioned at the Null point can be acquired.

Fourth Embodiment

In the tire pressure detection systems 5 according to the first to third embodiments, the storage unit 12 stores the identification information table, and, if a plurality of response signals are received from a plurality of detection apparatuses 2 in response to the high-power request signal, a response signal from a non-received detection apparatus 2 is identified based on the identification information table.

In contrast, in a fourth embodiment, a storage unit 12 does not store the identification information table, and stores the positional relation between tires 3 and LF transmission antennas 14a.

Figure 6:
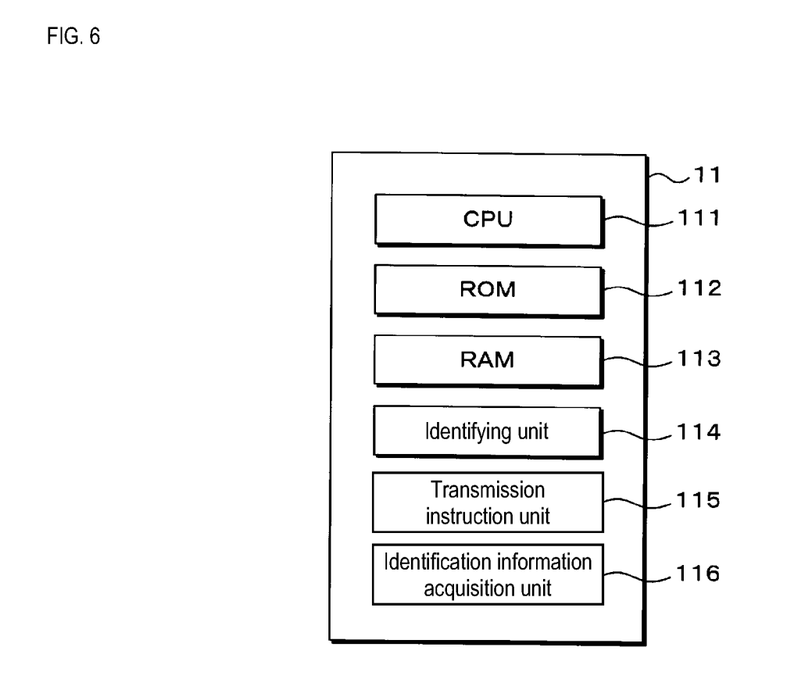
FIG. 6 is a functional block diagram illustrating an example of a main configuration of a control unit according to a fourth embodiment.

FIG. 6 is a functional block diagram illustrating an example of a main configuration of a control unit 11 according to the fourth embodiment. The control unit 11 includes a CPU 111, a ROM 112, a RAM 113, and an identifying unit 114, and also includes a transmission instruction unit 115 and an identification information acquisition unit 116.

A predetermined detection apparatus 2 (non-received detection apparatus 2) is positioned at a Null point, and thus, in the case of an abnormality where the non-received detection apparatus 2 cannot receive a request signal, the transmission instruction unit 115 gives a transmission instruction to a plurality of LF transmission antennas 14a corresponding to the detection apparatuses 2 excluding the non-received detection apparatus 2, from among the detection apparatuses 2 corresponding to the tires 3. The transmission instruction is an instruction to transmit a request signal to the detection apparatuses 2 respectively corresponding to the LF transmission antennas 14a.

The identification information acquisition unit 116 receives response signals in response to the request signals transmitted from the LF transmission antennas 14a excluding the LF transmission antenna 14a corresponding to the non-received detection apparatus 2, in accordance with the transmission instruction from the transmission instruction unit 115, and acquires the identification information from the received response signals. In other words, the identification information acquisition unit 116 acquires identification information from the response signals transmitted by the detection apparatuses 2 excluding the non-received detection apparatus 2, in accordance with the transmission instruction.

If a plurality of response signals to a high-power request signal are received, the identifying unit 114 identifies a response signal from the non-received detection apparatus 2, based on the identification information acquired by the identification information acquisition unit 116.

Figure 7:
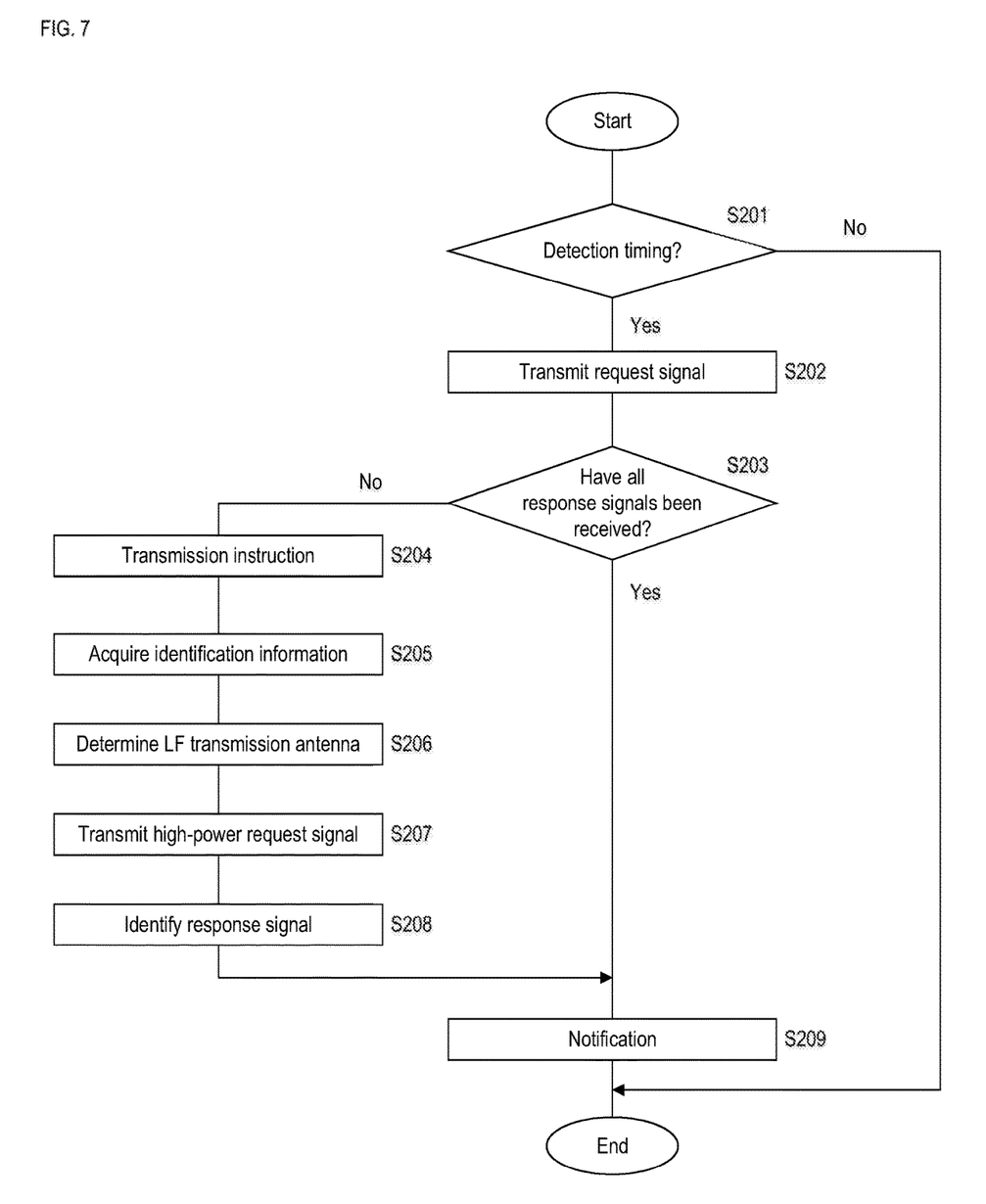
FIG. 7 is a flowchart illustrating a procedure of tire pressure detection processing in a tire pressure detection system according to the fourth embodiment.

FIG. 7 is a flowchart illustrating a procedure of tire pressure detection processing in the tire pressure detection system 5 according to the fourth embodiment. For convenience of description, a description will be given below assuming that, when an ignition switch 6 changes from an off state to an on state, the control unit 11 of the monitoring apparatus 1 executes the following processing. Note that detailed description of the same processes as those in FIG. 5 in the first embodiment is omitted.

The CPU 111 determines whether or not the timing is a required detection timing (step S201). If it is determined that the timing is not the detection timing (step S201: NO), the CPU 111 ends the tire pressure detection processing.

On the other hand, if it is determined that the timing is the detection timing (step S201: YES), the CPU 111 instructs the LF transmission antennas 14a to transmit a request signal. The LF transmission antennas 14a transmit a request signal to the corresponding detection apparatuses 2 in accordance with the instruction made by the CPU 111 (step S202). The LF transmission antennas 14a transmit a request signal in a predetermined order. When a detection apparatus 2 transmits a response signal in response to the request signal, the response signal is received by the RF receiving antenna 13a.

Next, the CPU 111 determines whether or not a response signal has been received from all of the detection apparatuses 2 (step S203). For example, the LF transmission antennas 14a transmit a request signal in a predetermined order, and every time a request signal is transmitted, the CPU 111 checks receipt of the response signal.

If the CPU 111 determines that a response signal has been received from all of the detection apparatuses 2 (step S203: YES), the identifying unit 114 determines, based on a request signal transmission order and the positional relation between the tires 3 and the LF transmission antennas 14a, which tire position (tire 3) the air pressure information included in each response signal corresponds to.

The CPU 111 then outputs air pressure information of the tire positions for which the determination was made, to the notification apparatus 4. The notification apparatus 4 notifies the driver of the air pressure information (step S209).

On the other hand, if the LF transmission antennas 14a transmit a request signal in a predetermined order, and receipt of a response signal is not acknowledged after a request signal has been transmitted from a specific LF transmission antenna 14a, the CPU 111 determines that a response signal has not been received from all of the detection apparatuses 2 (step S203: NO). Accordingly, the detection apparatus 2 corresponding to the specific LF transmission antenna 14a is positioned at a Null point, and the detection apparatus 2 is the non-received detection apparatus 2.

At this time, the transmission instruction unit 115 gives a transmission instruction for instructing a plurality of LF transmission antennas 14a corresponding to the detection apparatuses 2 excluding the non-received detection apparatus 2 to transmit a request signal to the corresponding detection apparatuses 2 (step S204). A request signal is transmitted from the LF transmission antennas 14a excluding the LF transmission antenna 14a corresponding to the non-received detection apparatus 2, in accordance with the transmission instruction from the transmission instruction unit 115. The detection apparatuses 2 transmit a response signal in response to the request signal, and response signals are received via an RF receiving antenna 13a. The identification information acquisition unit 116 acquires, from the plurality of received response signals, the identification information indicating the detection apparatuses 2 that transmitted the response signals (step S205). The acquired identification information is stored in the storage unit 12 or the RAM 113. By performing such processing, the identification information of the detection apparatuses 2 excluding the non-received detection apparatus 2 can be acquired.

Next, the CPU 111 determines one LF transmission antenna 14a (another transmission apparatus) (step S206). As described above, a non-received detection apparatus 2 can be identified, and thus the CPU 111 determines one LF transmission antenna 14a from among the LF transmission antennas 14a excluding the LF transmission antenna 14a (one transmission apparatus) corresponding to the non-received detection apparatus 2. To be specific, the CPU 111 determines an LF transmission antenna 14a that is closest to the non-received detection apparatus 2, from among the LF transmission antennas 14a corresponding to the detection apparatuses 2 excluding the non-received detection apparatus 2, from among the detection apparatuses 2 corresponding to the four tires 3. The present disclosure is not limited thereto, and the CPU 111 may also determine one LF transmission antenna 14a corresponding to a detection apparatus 2 other than the non-received detection apparatus 2, from among the detection apparatuses 2 corresponding to the four tires 3.

In addition, the CPU 111 instructs the LF transmission antenna 14a determined in step S206 to transmit a high-power request signal.

The determined LF transmission antenna 14a transmits a high-power request signal in accordance with the instruction made by the CPU 111 (step S207). The high-power request signal transmitted by the determined LF transmission antenna 14a causes crosstalk with a plurality of detection apparatuses 2 that include the non-received detection apparatus 2, and thus, the plurality of detection apparatuses 2 transmit a response signal in response to the high-power request signal. Thus, the RF receiving antenna 13a receives a plurality of response signals from the plurality of detection apparatuses 2 substantially at the same time.

The identifying unit 114 matches identification information included in the response signals received from the plurality of detection apparatuses 2 via the RF receiving antenna 13a, with identification information of the detection apparatuses 2 excluding the non-received detection apparatus 2 acquired in step S205. At this time, there is one response signal (hereinafter, referred to as "unmatched response signal") whose identification information cannot be matched. The identifying unit 114 identifies the unmatched response signal as a response signal from the non-received detection apparatus 2 (step S208). Accordingly, it is possible to acquire the air pressure information included in the response signal from the non-received detection apparatus 2. After that, the CPU 111 advances the procedure to step S209.

As described above, in the tire pressure detection system 5 according to the fourth embodiment, when a predetermined detection apparatus 2 is positioned at a Null point, and even when the correspondence relation between the positions of the tires 3 and the detection apparatuses 2 is unknown, a response signal can be received from a detection apparatus 2 positioned at the Null point, and its air pressure information can be acquired.

Note that the fourth embodiment is not limited to the above description. A configuration may also be adopted in which, in step S206, the CPU 111 determines an in-cabin LF transmission antenna 14b or a storage portion LF transmission antenna 14c, instead of determining one of the LF transmission antennas 14a corresponding to the detection apparatuses 2 excluding the non-received detection apparatus 2, from among the detection apparatuses 2 corresponding to the four tires 3.

The same reference numerals are assigned to portions similar to those in the first embodiment, and a detailed description thereof is omitted.

Fifth Embodiment

Figure 8:
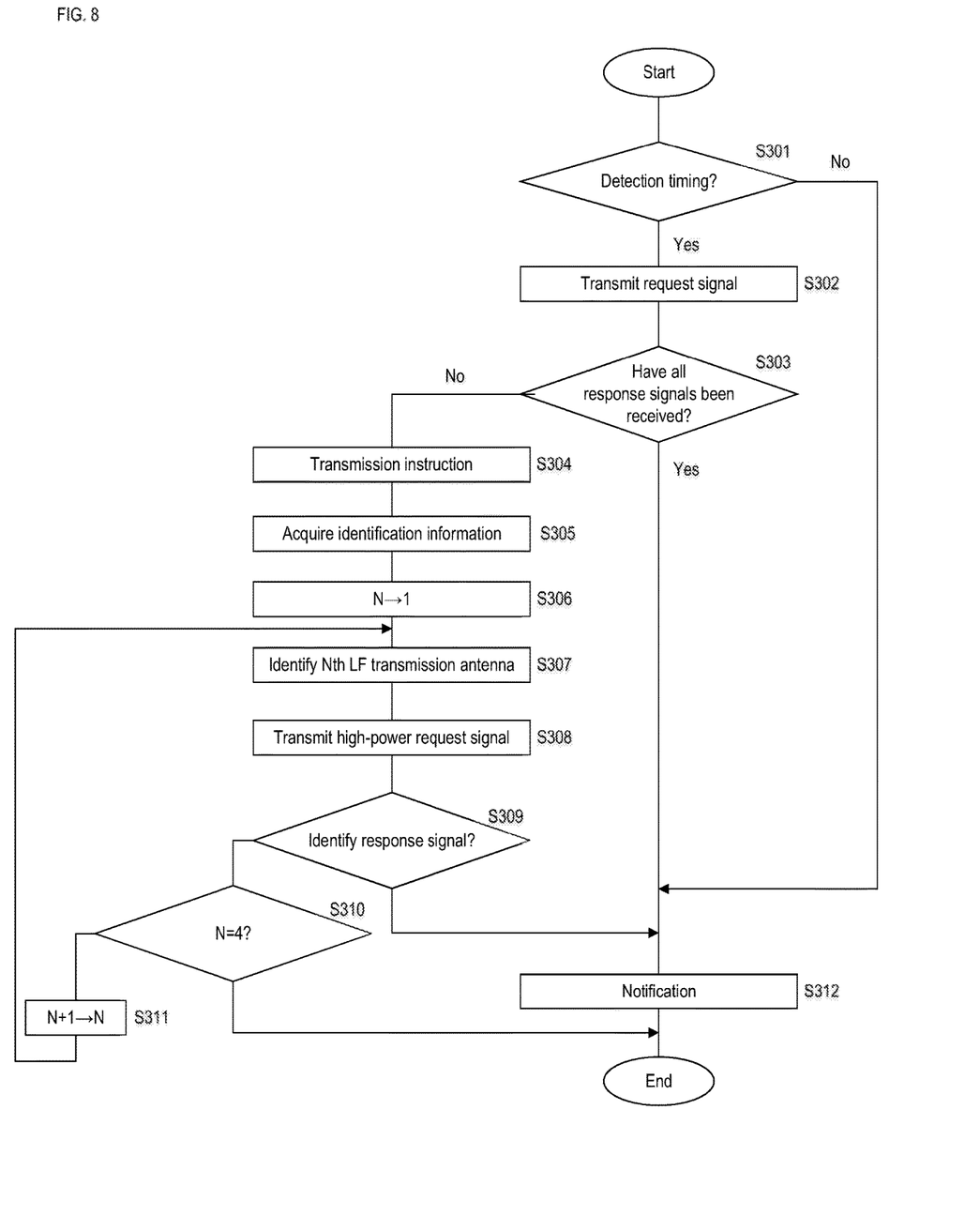
FIG. 8 is a flowchart illustrating a procedure of tire pressure detection processing in a tire pressure detection system according to a fifth embodiment.

A tire pressure detection system 5 according to a fifth embodiment has a configuration similar to the configuration of the tire pressure detection system 5 according to the fourth embodiment, but determination of an LF transmission antenna 14a that is to transmit a high-power request signal is different. A detailed description thereof will be given below. FIG. 8 is a flowchart illustrating a procedure of tire pressure detection processing in the tire pressure detection system 5 according to the fifth embodiment. For convenience of description, a description will be given below assuming that, when the ignition switch 6 changes from an off state to an on state, the control unit 11 of the monitoring apparatus 1 executes the following processing.

In addition, the storage unit 12 stores the positional relation between the tires 3 (the detection apparatuses 2) and the LF transmission antennas 14a. For example, in the storage unit 12, first to fourth LF transmission antennas 14a are respectively associated with the four tires 3.

Processes in steps S301 to 305 in FIG. 8 are the same as the processes in steps S201 to 205 in FIG. 7, and thus a detailed description thereof is omitted. In addition, the process in step S312 in FIG. 8 is the same as the process in step S209 in FIG. 7, and thus a detailed description thereof is omitted.

After identification information of the detection apparatuses 2 excluding a non-received detection apparatus 2 is acquired in step S305, the CPU 111 substitutes 1 for "N" (step S306), and identifies an Nth LF transmission antenna 14a (step S307). Specifically, "N" is currently 1, and thus the CPU 111 identifies a first LF transmission antenna 14a as an LF transmission antennas 14a that is to transmit a high-power request signal.

In addition, the CPU 111 instructs the identified LF transmission antenna 14a identified in step S307 to transmit a high-power request signal.

The identified LF transmission antenna 14a transmits a high-power request signal in accordance with the instruction of the CPU 111 (step S308). The high-power request signal transmitted by the identified LF transmission antenna 14a causes crosstalk with a plurality of detection apparatuses 2 that include the non-received detection apparatus 2, and thus the plurality of detection apparatuses 2 transmit a response signal in response to the high-power request signal. Thus, the RF receiving antenna 13a receives a plurality of response signals from the plurality of detection apparatuses 2 substantially at the same time.

The identifying unit 114 matches identification information included in the response signals received from the plurality of detection apparatuses 2 via the RF receiving antenna 13a, with identification information of the detection apparatuses 2 excluding the non-received detection apparatus 2 acquired in step S305. At this time, there is an unmatched response signal to which identification information cannot be matched, and thus the identifying unit 114 can identify the unmatched response signal as a response signal from the non-received detection apparatus 2. If the identifying unit 114 can identify a response signal from the non-received detection apparatus 2, air pressure information can be acquired from the non-received detection apparatus 2. The identifying unit 114 identifies a response signal from the non-received detection apparatus 2, and notifies the CPU 111 of the identifying result.

The CPU 111 determines whether or not a response signal from the non-received detection apparatus 2 can be identified, based on the notification from the identifying unit 114 (step S309). If it is determined that a response signal from the non-received detection apparatus 2 can be identified (step S309: YES), the CPU 111 advances the procedure to step S312.

On the other hand, for example, if a response signal has not been received from the non-received detection apparatus 2 yet, the CPU 111 determines that a response signal from the non-received detection apparatus 2 cannot be identified (step S309: NO), and continues to determine whether or not the current value of "N" is 4 (step S310).

If it is determined that the current value of "N" is not 4 (step S310: NO), the CPU 111 adds 1 to "N" to set a new value of "N" (step S311). After that, the procedure returns to step S307 again. Unless the CPU 111 determines that a response signal from the non-received detection apparatus 2 can be identified, processes in steps S307 to 311 are repeatedly performed until "N" reaches 4.

Specifically, until a response signal from the non-received detection apparatus 2 can be identified by the identifying unit 114, the first to fourth LF transmission antennas 14a sequentially transmit a high-power request signal.

On the other hand, if it is determined in step S310 that the current value of "N" is 4 (step S310: YES), the CPU 111 ends the procedure. For example, if a response signal from the non-received detection apparatus 2 could not be received although the first to fourth LF transmission antennas 14a sequentially transmitted a high-power request signal (crosstalk), the procedure ends.

As described above, also in the tire pressure detection system 5 according to the fifth embodiment, if a predetermined detection apparatuses 2 is positioned at a Null point, and also if the correspondence relation between the positions of the tires 3 and the detection apparatuses 2 is unknown, a response signal can be received from the detection apparatuses 2 positioned at the Null point, and air pressure information can be acquired.

Note that the fifth embodiment is not limited to the above description. A configuration may also be adopted in which, in step S307, the CPU 111 identifies the in-cabin LF transmission antenna 14b or the storage portion LF transmission antenna 14c instead of identifying one of the first to fourth LF transmission antennas 14a.

Note that the above-described identifying unit 114, transmission instruction unit 115, and identification information acquisition unit 116 may also be configured as hardware logic, or may be constructed in a software-like manner by the CPU 111 executing a predetermined program.

The disclosed embodiments are to be considered as illustrative and non-limiting in all aspects. The scope of the present disclosure is indicated not by the above-stated meanings but by the scope of claims, and is intended to include all modifications that are within the meanings and the scope that are equivalent to those of the scope of claims.

The invention claimed is:

1. A tire pressure detection system comprising:
a plurality of transmission apparatuses that transmit a request signal for requesting air pressure information of a tire of a vehicle; a detection apparatus that detects air pressure in a tire in accordance with the request signal, and transmits a response signal that includes air pressure information; and an acquisition apparatus that receives the response signal, and acquires the air pressure information,
wherein the plurality of transmission apparatuses include:
one transmission apparatus that transmits the request signal to the detection apparatus, and
another transmission apparatus that transmits a high-power request signal of a higher output level than the request signal of the one transmission apparatus in a case of an abnormality where a response signal in response to the request signal of the one transmission apparatus is not received by the acquisition apparatus.

2. The tire pressure detection system according to claim 1, wherein a plurality of tires are included,
the detection apparatus is provided on each of the tires, and
in a normal case different from the abnormality,
the one transmission apparatus transmits the request signal to one detection apparatus, and causes the one detection apparatus to return the response signal, and
the other transmission apparatus transmits the request signal to detection apparatuses excluding the one detection apparatus, and causes the detection apparatuses to return the response signal.

3. The tire pressure detection system according to claim 2, wherein the response signal includes identification information of a detection apparatus that transmitted the response signal, and
the tire pressure detection system includes a storage unit that stores identification information of a plurality of detection apparatuses provided on the respective tires, and
an identifying unit that identifies a response signal from the one detection apparatus, based on the identification information in the storage unit, if a plurality of response signals were received in response to the high-power request signal.

4. The tire pressure detection system according to claim 3, wherein the number of other transmission apparatuses is two or more, and
the plurality of other transmission apparatuses sequentially transmit the high-power request signal.

5. The tire pressure detection system according to claim 2, wherein the response signal includes identification information of a detection apparatus that transmitted the response signal,
the plurality of transmission apparatuses are arranged respectively in correspondence with detection apparatuses to which the request signal is transmitted in the normal case, and
the tire pressure detection system includes:
a transmission instruction unit that gives a transmission instruction for instructing the other transmission apparatuses to transmit the request signal to the respective detection apparatuses to which the request signal is transmitted, if no response signal is received in response to the request signal of the one transmission apparatus,
an identification information acquisition unit that acquires the identification information from the response signal in response to the request signal transmitted in accordance with the transmission instruction, and
an identifying unit that identifies a response signal from the one detection apparatus based on the acquired identification information, if a plurality of response signals are received in response to the high-power request signal.

6. The tire pressure detection system according to claim 5, wherein the number of other transmission apparatuses is two or more, and
the plurality of other transmission apparatuses sequentially transmit the high-power request signal.

7. The tire pressure detection system according to claim 2, wherein the number of other transmission apparatuses is two or more, and the plurality of other transmission apparatuses sequentially transmit the high-power request signal.

8. The tire pressure detection system according to claim 1, wherein a plurality of tires are included, the detection apparatus is provided on each of the tires, and in a normal case different from the abnormality,
the one transmission apparatus transmits the request signal to one detection apparatus, and causes the one detection apparatus to return the response signal, and
the other transmission apparatus is disposed in a cabin of the vehicle.

9. The tire pressure detection system according to claim 8, wherein the response signal includes identification information of a detection apparatus that transmitted the response signal, and the tire pressure detection system includes a storage unit that stores identification information of a plurality of detection apparatuses provided on the respective tires, and an identifying unit that identifies a response signal from the one detection apparatus, based on the identification information in the storage unit, if a plurality of response signals were received in response to the high-power request signal.

10. The tire pressure detection system according to claim 8, wherein the number of other transmission apparatuses is two or more, and the plurality of other transmission apparatuses sequentially transmit the high-power request signal.

11. The tire pressure detection system according to claim 1, wherein a plurality of tires are included, the detection apparatus is provided on each of the tires, and in a normal case different from the abnormality,
the one transmission apparatus transmits the request signal to one detection apparatus, and causes the one detection apparatus to return the response signal, and
the other transmission apparatus is disposed in a storage portion of the vehicle.

12. The tire pressure detection system according to claim 11, wherein the response signal includes identification information of a detection apparatus that transmitted the response signal, and the tire pressure detection system includes a storage unit that stores identification information of a plurality of detection apparatuses provided on the respective tires, and an identifying unit that identifies a response signal from the one detection apparatus, based on the identification information in the storage unit, if a plurality of response signals were received in response to the high-power request signal.

13. The tire pressure detection system according to claim 11, wherein the number of other transmission apparatuses is two or more, and the plurality of other transmission apparatuses sequentially transmit the high-power request signal.

14. The tire pressure detection system according to claim 1, wherein the number of other transmission apparatuses is two or more, and the plurality of other transmission apparatuses sequentially transmit the high-power request signal.

* * * * *